(12) United States Patent
Won et al.

(10) Patent No.: US 12,441,018 B2
(45) Date of Patent: Oct. 14, 2025

(54) ELECTRODE SHEET CUTTING DEVICE AND METHOD

(71) Applicant: LG Energy Solution, Ltd., Seoul (KR)

(72) Inventors: Jong Hyun Won, Daejeon (KR); Gyo Ryun No, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/276,548

(22) PCT Filed: Dec. 15, 2022

(86) PCT No.: PCT/KR2022/020420
§ 371 (c)(1),
(2) Date: Aug. 9, 2023

(87) PCT Pub. No.: WO2023/113485
PCT Pub. Date: Jun. 22, 2023

(65) Prior Publication Data
US 2024/0083061 A1 Mar. 14, 2024

(30) Foreign Application Priority Data

Dec. 15, 2021 (KR) .................. 10-2021-0179723

(51) Int. Cl.
*B26D 5/00* (2006.01)
*B65H 35/06* (2006.01)
*G06T 7/73* (2017.01)

(52) U.S. Cl.
CPC ............... *B26D 5/007* (2013.01); *G06T 7/73* (2017.01); *B65H 35/06* (2013.01); *G06T 2207/30108* (2013.01); *G06V 2201/06* (2022.01)

(58) Field of Classification Search
CPC .................. B65H 35/06; B26D 5/007
See application file for complete search history.

(56) References Cited

U.S. PATENT DOCUMENTS

| | | | | |
|---|---|---|---|---|
| 5,825,913 A | * | 10/1998 | Rostami | G06T 7/73 348/87 |
| 10,752,461 B2 | * | 8/2020 | Shimizu | B65H 16/005 |
| 11,079,522 B1 | * | 8/2021 | Dong | G06T 7/73 |
| 11,885,605 B2 | * | 1/2024 | Scarfe | G06T 7/62 |
| 2013/0144568 A1 | * | 6/2013 | Palma-Amestoy | G01B 11/24 703/1 |
| 2015/0217963 A1 | * | 8/2015 | Shimizu | B65H 35/008 156/256 |

(Continued)

FOREIGN PATENT DOCUMENTS

| | | |
|---|---|---|
| CN | 112751071 A | 5/2021 |
| JP | 2017111864 A | 6/2017 |

(Continued)

OTHER PUBLICATIONS

International Search Report for PCT/KR2022/020420 mailed Mar. 22, 2023. 3 pages.

*Primary Examiner* — Sean M Michalski
(74) *Attorney, Agent, or Firm* — Lerner David LLP

(57) ABSTRACT

One aspect of the present disclosure relates to an electrode sheet cutting device and method, and more particularly, recognizes a shape of an electrode tab using a vision system and then identifies a cutting position to determine the cutting position of the electrode sheet, thereby improving the cutting accuracy of the electrode sheet.

5 Claims, 4 Drawing Sheets

(56) References Cited

U.S. PATENT DOCUMENTS

| | | | |
|---|---|---|---|
| 2020/0139569 A1 | 5/2020 | Wi et al. | |
| 2020/0235433 A1 | 7/2020 | Kim et al. | |
| 2021/0098817 A1 | 4/2021 | Lee | |
| 2021/0291404 A1* | 9/2021 | Komatsu | B28D 5/024 |
| 2023/0411583 A1* | 12/2023 | Chang | B65H 35/06 |
| 2024/0083061 A1* | 3/2024 | Won | H01M 10/0404 |

FOREIGN PATENT DOCUMENTS

| | | |
|---|---|---|
| KR | 101509208 B1 | 4/2015 |
| KR | 20150086042 A | 7/2015 |
| KR | 20160051347 A | 5/2016 |
| KR | 20170093377 A | 8/2017 |
| KR | 20180119946 A | 11/2018 |
| KR | 20190127283 A | 11/2019 |
| KR | 20200131393 A | 11/2020 |
| KR | 102191183 B1 | 12/2020 |
| KR | 20210125281 A | 10/2021 |
| KR | 102330719 B1 | 11/2021 |

* cited by examiner

[Figure 1]
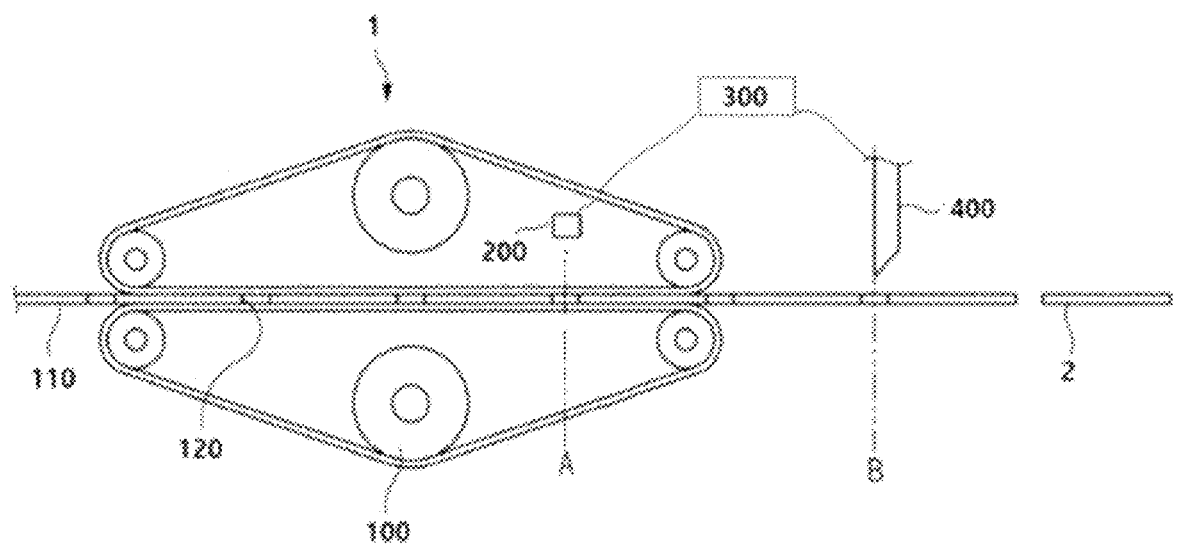
[Figure 2a]
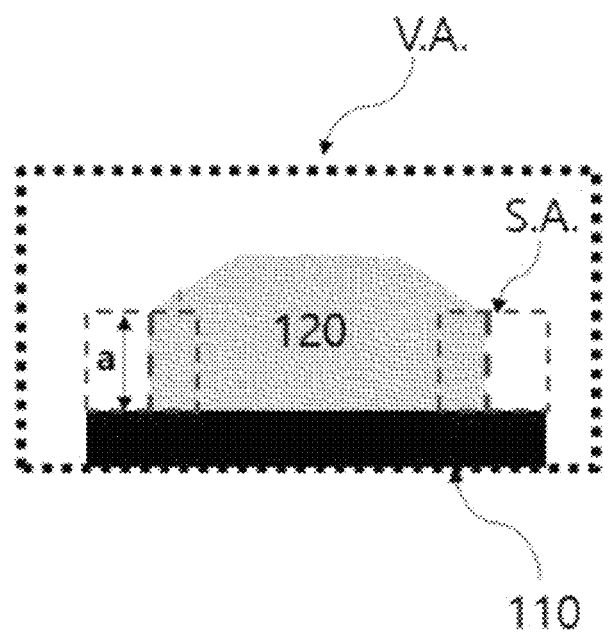

[Figure 2b]
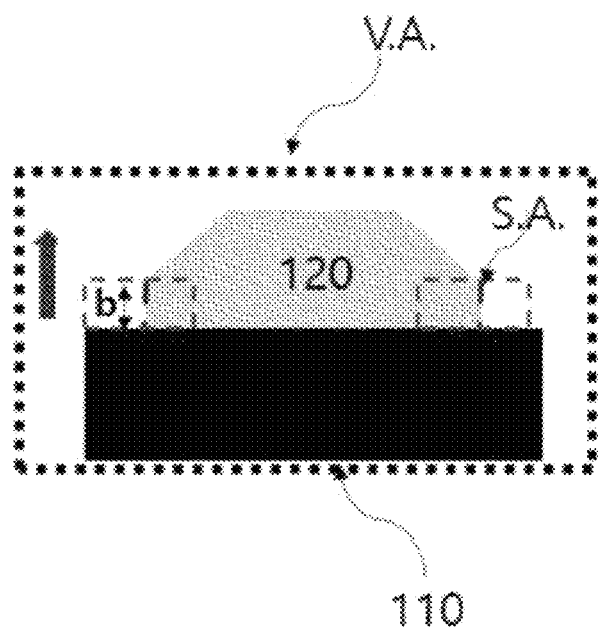
[Figure 3]
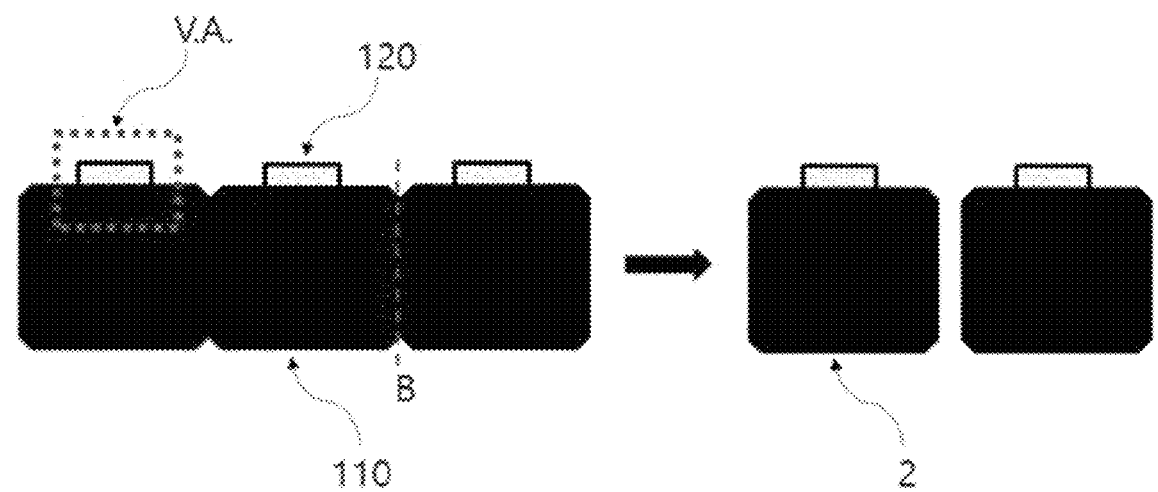

[Figure 4a]
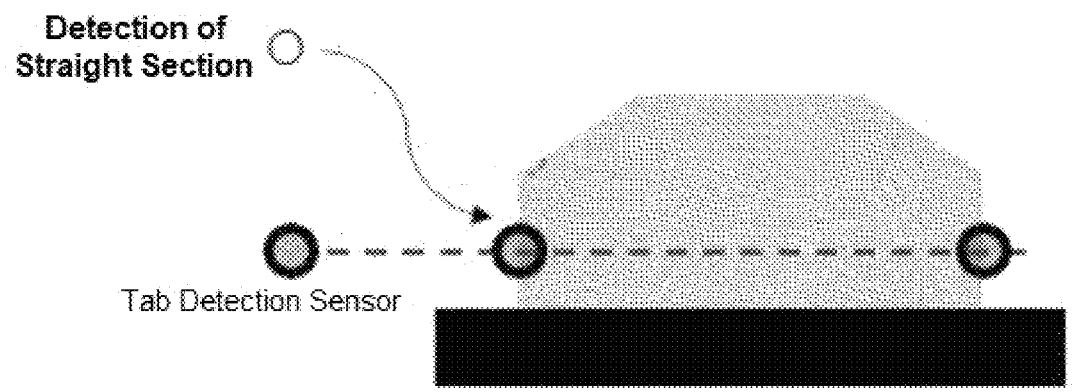
Normal Detection of Straight Section of Tab by Detection Sensor
[Figure 4b]
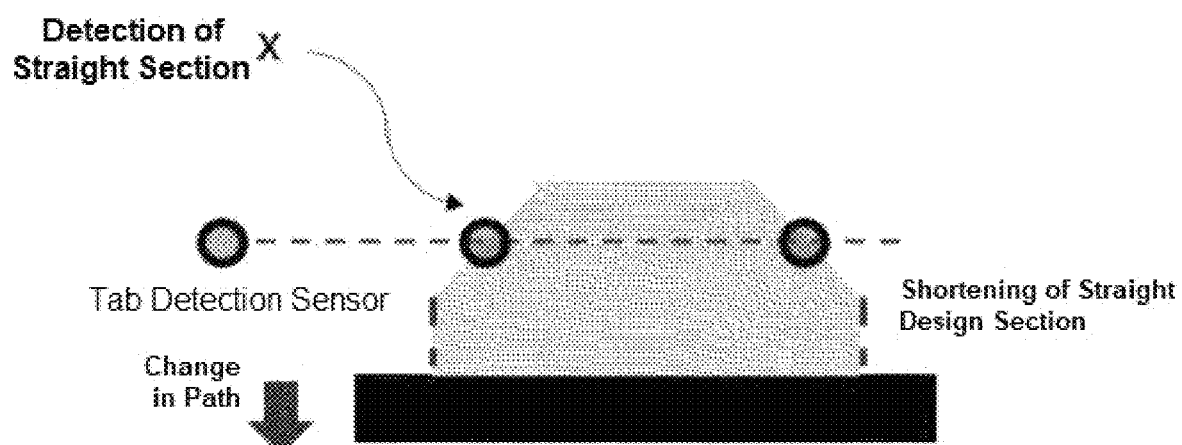
Normal Detection of Straight Section of Tab by Detection Sensor

[Figure 5]
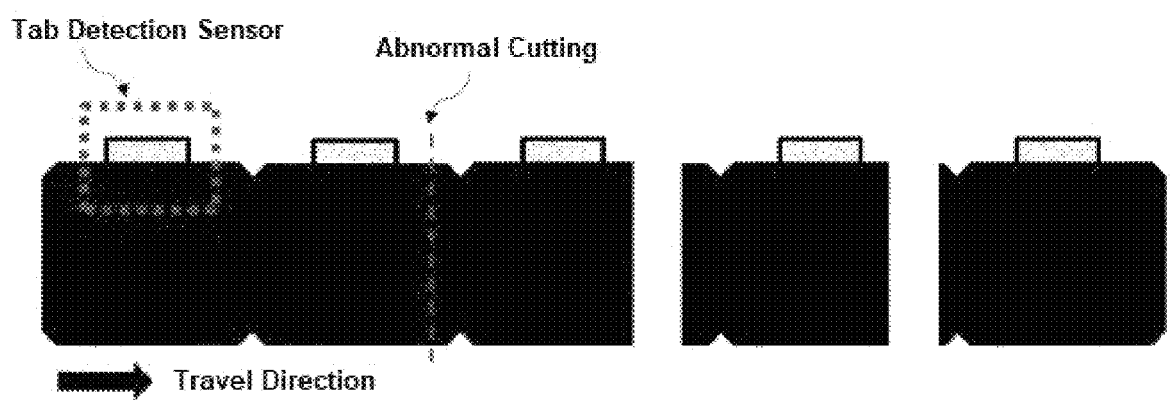

ELECTRODE SHEET CUTTING DEVICE AND METHOD

CROSS-REFERENCE TO RELATED APPLICATIONS

This application is a national stage entry under 35 U.S.C. § 371 of International Application No. PCT/KR2022/020420, filed on Dec. 15, 2022, which claims priority to Korean Patent Application No. 10-2021-0179723, filed on Dec. 15, 2021, the disclosures of which are hereby incorporated as by reference herein in their entireties.

TECHNICAL FIELD

One aspect of the present disclosure relates to an electrode sheet cutting device and method for improving the accuracy of a cutting position when cutting an electrode sheet.

BACKGROUND ART

In general, unlike a primary battery that cannot be charged, a secondary battery refers to a battery that can be charged and discharged, and such a secondary battery is widely used in the field of advanced electronic devices such as automobiles, phones, laptop computers, and camcorders.

The secondary battery described above is classified into a can-type secondary battery in which an electrode assembly is embedded in a metal can and a pouch-type secondary battery in which an electrode assembly is embedded in a pouch. The pouch-type secondary battery includes an electrode assembly, an electrolytic solution, and a pouch accommodating the electrode assembly and the electrolytic solution. The electrode assembly has a structure in which a plurality of electrodes and a plurality of separators are alternately laminated.

The lamination process, which is one of the unit processes for automobile battery assembly, is a process in which electrodes wound in units of rolls are individually cut to targeting positions while unwinding, and then, are aligned with a separator and sealed to produce semi-finished products in the form of monocell or bicell. The monocell or bicell refers to a semi-finished product in which a laminate in which a separator is positioned between electrodes with different polarities is cut to an appropriate size.

In the lamination process, an operation of cutting the unwound electrode to the target position is performed by allowing a tab detection sensor to detect a straight section of a tab and calculating a distance to be cut before the electrode is cut.

In this case, the distance to be cut may be accurately calculated only when the tab detection sensor clearly recognizes the straight section of the tab. When a path line is changed due to meandering of the electrode or a setting position of the tab detection sensor is misaligned, the tab detection sensor does not properly recognize the straight section of the tab, so there may be a problem in that the accuracy of the cutting position is lowered, and thus the defective electrodes are manufactured.

PRIOR ART DOCUMENT

Patent Document (Patent Document 1) Korean Patent No. 1509208

DISCLOSURE

Technical Problem

The inventors of one aspect of the present disclosure have conducted various studies to solve the above problems, and as a result, confirmed that the reading accuracy on the cutting position of the electrode sheet may be improved when determining the cutting position of the electrode sheet using a vision that recognizes the entire shape of tabs formed at regular intervals on the electrode sheet.

An object of one aspect of the present disclosure is to provide an electrode sheet cutting device capable of improving the cutting accuracy of an electrode sheet.

Another object of one aspect of the present disclosure is to provide an electrode sheet cutting method capable of improving the cutting accuracy of an electrode sheet.

Technical Solution

Accordingly, one aspect of the present disclosure provides an electrode sheet cutting device, including: a conveyor that conveys an electrode sheet having a plurality of electrode tabs formed on one side surface of the electrode sheet at regular intervals from a measuring point to a cutting point;
  a detector that is provided at the measuring point and detects a shape of the electrode tab formed on the electrode sheet passing through the measuring point to generate an electrode tab detection signal;
  a controller that receives the electrode tab detection signal generated by the detector and determines a cutting portion of the electrode sheet; and
  a cutter that cuts the cutting portion of the electrode sheet determined by the controller.

The detector may include a vision system that detects the shape of the electrode tab formed on the electrode sheet passing through the measuring point to generate the electrode tab detection signal.

The vision system may include a vision camera that recognizes the entire shape of the electrode tab.

The controller may determine a position of the electrode tab and a cutting portion between adjacent electrode tabs using the received electrode tab detection signal.

In addition, another aspect of the present disclosure provides an electrode sheet cutting method, including the steps of: (S1) conveying an electrode sheet having a plurality of electrode tabs formed on one side surface of the electrode sheet at regular intervals from a measuring point to a cutting point;
  (S2) detecting a shape of the electrode tab formed on the electrode sheet passing through the measuring point to generate an electrode tab detection signal;
  (S3) determining a cutting position on the electrode sheet using the electrode tab detection signal; and
  (S4) cutting the electrode sheet along the determined cutting position.

Advantageous Effects

According to an electrode sheet cutting device according to the present invention, it is possible to improve cutting accuracy of the electrode sheet by detecting the entire shape of tabs formed on an electrode sheet conveyed in one direction using a vision, and determining the cutting position of the electrode sheet based on the detected shape of the tabs.

DESCRIPTION OF DRAWINGS

FIG. 1 is a schematic diagram of an electrode sheet cutting device according to an embodiment of one aspect of the present disclosure.

FIGS. 2A and 2B are schematic diagrams illustrating a shape of an electrode tab detected by a vision system according to an embodiment of one aspect of the present disclosure.

FIG. 3 is a schematic diagram illustrating a process of cutting an electrode sheet after a cutting portion is determined using a shape of the electrode tab detected by the vision system according to an embodiment of one aspect of the present disclosure.

FIGS. 4A and 4B are schematic diagrams illustrating a shape of an electrode tab detected by a vision system according to the Comparative Example of one aspect of the present disclosure.

FIG. 5 is a schematic diagram illustrating a process of cutting the electrode sheet after the cutting portion is determined using the shape of the electrode tab detected by the vision system according to the Comparative Example of one aspect of the present disclosure.

BEST MODE

Hereinafter, description will be made with reference to drawings according to embodiments of the present invention, but this is for easier understanding of the present invention, and the scope of the present invention is not limited thereto.

Electrode Sheet Cutting Device

One aspect of the present disclosure relates to an electrode sheet cutting device, and detects a shape of an electrode tab formed at regular intervals on the side surface of the electrode sheet and determines a cutting position of the electrode sheet using the detected shape of the electrode tab, thereby improving the cutting accuracy of the electrode sheet.

FIG. 1 is a schematic diagram of an electrode sheet cutting device according to an embodiment of one aspect of the present disclosure.

Referring to FIG. 1, an electrode sheet cutting device 1 includes: a conveyor 100 that conveys an electrode sheet 110 having a plurality of electrode tabs 120 formed on one side thereof at regular intervals to a cutting point B through a measuring point A;

a detector 200 that is provided at the measuring point A and detects a shape of the electrode tab 120 formed on the electrode sheet 110 passing through the measuring point A to generate an electrode tab 120 detection signal;

a controller 300 that receives the electrode tab 120 detection signal generated by the detector 200 and determines a cutting portion of the electrode sheet 110; and a cutter 400 that cuts the cutting portion of the electrode sheet 110 determined by the controller 300.

Conveyor

In one aspect of the present disclosure, the conveyor 100 conveys the electrode sheet 110 on which the electrode tab 120 is formed to the cutting point B through the measuring point A. In this case, the conveyor 100 includes a conveyor belt that conveys the electrode sheet 110 so that the electrode tabs 120 formed at regular intervals on a side surface of the electrode sheet 110 are sequentially conveyed to the cutting point B through the measuring point A, and the conveyor belt is formed in a pair to support and convey the electrode sheet 110 at the same time.

In this case, the conveyor belt generally refers to a belt-shaped device that continuously moves and/or conveys objects, and is not particularly limited as long as it is a conveyor belt commonly used in the art. For example, the conveyor belt that may be applied to the conveyor 100 may include a belt part that rotates by being wound around a first roller and a second roller respectively disposed at both ends in a longitudinal direction. In this case, the longitudinal direction may refer to one direction in which the electrode sheet is moved.

Detector

In one aspect of the present disclosure, the detector 200 that is provided at the measuring point A and detects the shape of the electrode tab 120 formed on the electrode sheet 110 passing through the measuring point A to generate the electrode tab 120 detection signal. In this case, the meaning that the detector 200 is provided at the measuring point A refers to that the detector 200 is provided at a position where the shape of the electrode tab 120 formed on the electrode sheet 110 passing through the measuring point A may be checked.

The detector 200 may include a vision system 210 that detects the position of the electrode tab 120 by checking the shape of the electrode tab 120 passing through the measuring point A, and then generates the electrode tab 120 detection signal. In this case, the vision system 210 may check the entire shape of the electrode tab 120.

Since the vision system 210 may include a vision camera and detect the shape of the electrode tab 120 when the electrode sheet 100 is conveyed to identify the position of the electrode tab 120, it is possible to determine the cutting position of the electrode sheet 110.

In this case, since the vision system 210 may detect and check the entire shape of the electrode tab 120, even if the size or shape of the electrode tab 120 is somewhat irregular, it is possible to recognize the electrode tab 120 through the entire shape of the electrode tab 120.

The cutting position may be determined as an intermediate point between adjacent electrode tabs 120.

FIGS. 2A and 2B are schematic diagrams illustrating the shape of the electrode tab detected by the vision system according to the embodiment of one aspect of the present disclosure, and FIGS. 2A and 2B illustrate the case where lengths a and b of a straight section S.A. of the electrode tab 120 are different (a>b).

Referring to FIGS. 2A and 2B, an area V.A. detected by the vision system includes the entire shape of the electrode tab 120. Therefore, when the vision system is used, the electrode tab 120 may be detected even if the design of the electrode tab 120 is somewhat different. For example, although the length a of the straight section S.A. of the electrode tab 120 of FIG. 2A is longer than the length b of the straight section S.A. of the electrode tab 120 of FIG. 2B, since the vision system detects the electrode tab 120 based on the entire shape of the electrode tab 120, in both the cases, the cutting position may be accurately determined by normally detecting the electrode tab 120.

Controller

In one aspect of the present disclosure, the controller 300 may receive an electrode tab detection signal generated by the detector 200 and calculate and determine the accurate cutting position on the electrode sheet 110.

The cutting position may be determined as the intermediate point between the adjacent electrode tabs 120.

For example, the cutting position may be determined by calculating a center value of the adjacent electrode tabs 120 using the detection signal of the electrode tab 120 received from the detector 200.

In order to determine the cutting position by the controller, a "programmable logic controller (PLC)" or a "universal machine & automation controller (UMAC)" may be used.

Cutter

In one aspect of the present disclosure, the cutter 400 is provided at the cutting point B and cuts the electrode sheet 110 passing through the cutting point B according to the cutting position determined by the controller 400, thereby obtaining the unit electrode 2.

That is, when the detector 200 detects the electrode tab 120 passing through the measuring point A to determine the cutting position, the cutter 400 cuts the cutting position determined for the electrode sheet 100 passing through the cutting point B.

The electrode sheet cutting device according to the embodiment of one aspect of the present disclosure is characterized in that it detects the position through the shape of the electrode tab formed on the electrode sheet to cut the electrode sheet, and due to this characteristic, may accurately detect the time when the electrode sheet is cut, and thus may accurately cut the electrode sheet, thereby obtaining the unit electrodes having the same quality.

Electrode Sheet Cutting Method

Another aspect of the present disclosure also relates to an electrode sheet cutting method. The electrode sheet cutting method includes the steps of: (S1) continuously conveying an electrode sheet having a plurality of electrode tabs formed on one side surface of the electrode sheet at regular intervals to a cutting point through a measuring point; (S2) detecting a shape of the electrode tab formed on the electrode sheet passing through the measuring point to generate an electrode tab detection signal; (S3) determining a cutting position on the electrode sheet using the electrode tab detection signal; and (S4) cutting the electrode sheet along the determined cutting position. The electrode sheet cutting method may be performed using the electrode sheet cutting device as described above.

The steps S1, S2, S3, and (S4) may be performed in the conveyor, the detector, the controller, and the cutter of the electrode sheet cutting device, respectively.

FIG. 3 is a schematic diagram illustrating a process of cutting the electrode sheet after the cutting portion is determined using the shape of the electrode tab detected by the vision system according to an embodiment of another aspect of the present disclosure.

Referring to FIG. 3, the position of the electrode tab 120 may be known using the shape of the electrode tab 120 identified in the area V.A. detected by the vision system, and the intermediate point between the adjacent electrode tabs 120 is determined as the cutting point B to be cut, thereby manufacturing the unit electrode 2.

FIGS. 4A and 4B are schematic diagrams illustrating a shape of an electrode tab detected by a sensor according to the Comparative Example of the present invention. The sensor recognizes the electrode tab by detecting the straight section of the electrode tab. FIGS. 4A and 4B illustrate the case where the lengths a and b of the straight section S.A. of the electrode tab 120 are different (a>b).

FIG. 5 is a schematic diagram illustrating a process of cutting the electrode sheet after the cutting portion is determined using the shape of the electrode tab detected by the vision system according to Comparative Example of another aspect of the present disclosure.

Referring to FIGS. 4A and 4B, since the sensor detects the straight section of the electrode tab, when the length of the straight section is changed, the sensor may not detect the electrode tab, so, when the cutting point is incorrectly determined, as illustrated in FIG. 5, the cutting may occur at an abnormal location, resulting in defects.

Those skilled in the art in the field to which the present invention pertains will be able to make various applications and modifications within the scope of the present invention based on the above contents.

In the above, although the present invention has been described by way of limited embodiments and drawings, the present invention is not limited thereto, and it is apparent to those skilled in the art that various modifications and variations can be made within the equivalent scope of the technical spirit of the present invention and the claims to be described below.

[Description of Reference Numerals]

1: Electrode sheet cutting device
2: Unit electrode
100: Conveyor
110: Electrode sheet                           120: Electrode tab
200: Detector
210: Vision system
300: Controller
400: Cutter
A: Measuring point                             B: Cutting point
V.A.: Area detected by vision system
S.A.: Straight section of electrode tab
a, b: Length of straight section of electrode tab

The invention claimed is:

1. An electrode sheet cutting device, comprising:
a conveyor that is configured to move an electrode sheet having a plurality of electrode tabs formed on one side surface of the electrode sheet at regular intervals, the cutting device defining a measuring point and a cutting point spaced apart from one another along a movement direction of the conveyor;
a detector that is disposed adjacent to the measuring point, the detector configured to detect a shape of one of the electrode tabs formed on the electrode sheet passing through the measuring point such that an electrode tab detection signal is generated;
a controller that is configured to receive the electrode tab detection signal generated by the detector, the controller being configured to determine a cutting portion of the electrode sheet; and
a cutter that is configured to cut the cutting portion of the electrode sheet at a location along the electrode sheet that is determined by the controller.

2. The electrode sheet cutting device of claim 1, wherein the detector comprises a vision system that is configured to detect the shape of the one of the electrode tabs.

3. The electrode sheet cutting device of claim 2, wherein the vision system comprises a vision camera that is configured to recognize an entire shape of the one of the electrode tabs.

4. The electrode sheet cutting device of claim 1, wherein the controller is configured to determine a position of the one of the electrode tabs and is configured to determine a position of the cutting portion of the electrode sheet using the electrode tab detection signal, the cutting portion being located between adjacent ones of the plurality of electrode tabs.

5. An electrode sheet cutting method, comprising:
(S1) conveying an electrode sheet having a plurality of electrode tabs formed on one side surface of the electrode sheet at regular intervals, the electrode sheet being conveyed across a measuring point and a cutting point;
(S2) detecting a shape of one of the electrode tabs formed on the electrode sheet passing through the measuring point to generate an electrode tab detection signal;
(S3) determining a cutting position on the electrode sheet using the electrode tab detection signal; and
(S4) cutting the electrode sheet along the cutting position.

* * * * *